United States Patent Office 3,529,806
Patented Sept. 22, 1970

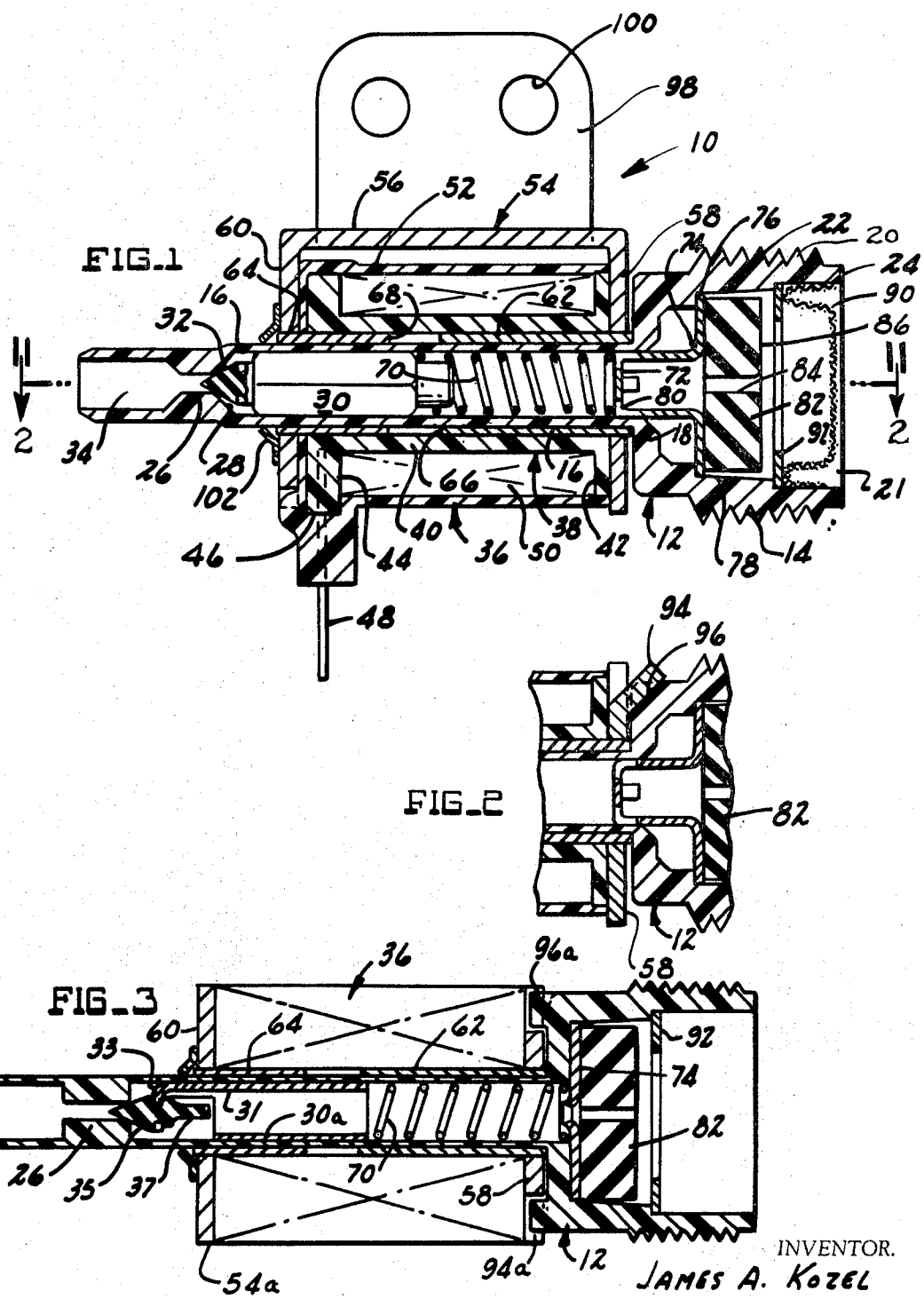

3,529,806
SOLENOID VALVE
James A. Kozel, 32540 Romsey, Franklin, Mich. 48025
Filed Sept. 1, 1967, Ser. No. 665,079
Int. Cl. F16k *31/02*
U.S. Cl. 251—139                                           4 Claims

ABSTRACT OF THE DISCLOSURE

This invention relates to a solenoid valve characterized by a single molded plastic body element configured to form a threaded inlet connection, a housing for a flow rate control member, a guide tube for the solenoid armature, a valve seat, and a tubular outlet.

A secondary feature of the valve is a metal insert which serves both as a seat for a resilient flow rate control member and as a seat for an armature-biasing spring.

A further feature of the valve is a low cost key-type antirotation mechanism between the solenoid frame and valve body, said mechanism being operable to prevent rotation of the valve body while a turning torque is being applied thereto incident to coupling the valve to a liquid supply line.

THE DRAWINGS

FIG. 1 is a longitudinal sectional view taken through one embodiment of the invention.

FIG. 2 is a fragmentary sectional view taken on line 2—2 in FIG. 1.

FIG. 3 is a longitudinal sectional view taken through another embodiment of the invention.

FIGS. 1 AND 2 IN GREATER DETAIL

There is shown in FIG. 1 a solenoid valve 10 comprising a molded one piece plastic valve body 12 which includes a cup-shaped housing 14 and an elongated tubular extension 16. Housing 14 comprises a back wall 18 and an annular side wall 20 which defines an open mouth 21 for receiving liquid from a supply line, not shown. In order to couple the valve to the supply line the outer surface of wall 20 is threaded as at 22. Connection of the supply line may be accomplished by threading a conventional coupling member, not shown, onto the threads 22 so that a washer in the supply line forms a sealed joint with end surface 24 of housing 14. The supply line can for example be a conventional rubber hose having the usual rotary coupling member carried thereon.

Tubular extension 16 is of cylindrical cross section (circular surfaces internally and externally), and is internally thickened at 26 to provide a valve seat 28 for the plunger armature 30. As shown in FIG. 1, plunger 30 is located with its convergent rubber tip 32 against valve seat 28 to prevent liquid flow into the outlet chamber 34.

Plunger 30 is formed of magnetically permeable material and is of noncircular cross section to permit liquid to pass from housing 14, through the tubular extension 16, and across the valve seat 28 when the solenoid coil 36 is energized. The illustrated plunger 30 is provided with four flat side surfaces so that liquid can pass between each flat surface and the cylindrical inner surface of tubular extension 16. It will be understood however that various armature cross sections could be employed, as for example fluted cross sections, notched cross sections, ported cross sections, etc.

The illustrated solenoid coil 36 comprises a plastic spool 38 having a tubular section 40, a first relatively thin end flange 42 and a second relatively thick flange 44. Flange 44 is formed with two slots extending radially inwardly from its flat end face 46, one of said slots receiving a flat spade-type terminal 48, and the other slot receiving a second similar spade-type terminal, not shown. One of the terminals is adapted to have an end wire portion of the electrical winding 50 wrapped therearound, and the other terminal is adapted to have the other end wire portion of the winding wrapped therearound. After winding the coil on spool 38 the spool-terminal-winding assembly is encapsulated in a plastic sheath 52, as by molding at elevated temperatures and pressures in an injection die. The same or different plastic materials can be employed for the spool and sheath.

To provide a magnetic circuit for the flux produced by the coil there is provided a magnetically permeable U-frame 54 having a web wall 56, a first flange 58 and a second flange 60. Each flange is provided with a circular opening for press fit reception of a magnetically permeable sleeve 62 or 64, said sleeves having their inner ends 66 and 68 terminating short of each other to define a centering gap to be bridged by the armature 30 when coil 50 is energized. Thus, when the coil is energized a magnetic flux path or circuit is established from pole piece sleeve 62, to flange 58, web wall 56, flange 60, pole piece sleeve 64, and armature 30. The magnetic flux tends to draw the armature 30 rightwardly toward a position centered with respect to the gap between sleeve ends 68 and 66. Precise centering may not be achieved due to the biasing action of spring 70.

To return armature 30 to its illustrated closed position there is provided a coil-type compression spring 70 having one of its ends engaged against the armature and having its other end engaged against the hat section 72 of a metallic thimble 74. Thimble 74 is equipped with an outwardly radiating base flange 76 which enjoys a press fit within annular surface 78. Thus, the thimble is installed by forcing same leftwardly so that its outer peripheral edge digs into the relatively soft plastic surface 78, thus locking the thimble in place. Section 72 is formed with one or more suitable flow openings 80 for permitting liquid to flow leftwardly into section 16.

To control the rate of flow in spite of varying liquid supply pressures there is provided a conventional elastomeric resilient flow control member 82 constructed, for example, as shown in U.S. Pat. 2,454,929. The flow control member is formed with a central flow opening 84 which progressively decreases in size as the liquid pressure increases on its upstream face 86. Thus, the central portion of the member tends to deflect or bend, and in so doing causes the inlet edge surfaces of opening 84 to move closer together in a flow-throttling action. The result is a substantially constant volumetric flow in spite of varying liquid supply pressures.

The illustrated valve is equipped with a conventional strainer 90 of foraminous or perforated construction, configured as a hat-shaped element. Preferably, the strainer seats against a metallic washer 92 which is pressed into the mouth of housing 14, said washer serving not only as a seat for strainer 90 but also as a retainer for the flow control member 82.

Referring to FIG. 2, there is shown a tab 94 formed integrally with frame flange 58 as a struck-out section. The tab extends into a slot 96 formed in the external surface of the valve body housing 14, the purpose being to prevent relative rotation between plastic member 12 and solenoid frame 54. Frame 54 preferably functions not only as a magnetic flux means but also as a mounting mechanism for the valve. For this reason the frame is formed with a plate-like extension 98 having one or more apertures 100 which receive mounting screws (not shown) for affixing the frame onto a support structure.

In assemblying the valve components together the frame 54 is preferably formed and clamped around the encapsulated coil 36; thereafter the pole-forming sleeves 62 and 64 are pressed into the openings in the frame flanges 58 and 60. The thus-formed subassembly is then slipped over the outer surface of the valve body extension 16 and is oriented so that tab 94 moves into slot 96. A conventional Tinnerman nut 102 is then forced onto sleeve 16 to prevent axial displacement of the coil and valve body.

Assuming the valve is mounted in a fixed location, as by screws going through apertures 100, the valve can be coupled to a liquid supply line by threading a coupling member onto the threads 22 in the manner previously mentioned. Such threading operations may produce a torque on the valve body 12, but tab 94 will prevent any inadvertant rotation of member 12. In lieu of tab 94 in the frame and a slot in the valve body, the reverse arrangement may be used; i.e., a slot in the frame and a tab or projection formed integrally with the valve body. The general idea is to form surface discontinuities 94 and 96 in the two parts which interfit or mate with one another for antirotation purposes.

FIG. 3 IN GREATER DETAIL

The plastic valve body 12a is substantially the same as body 12 except that lugs or projections 96a are formed thereon in place of the slot 96. Cooperating with projections 96a are two slots 94a formed in magnetic frame 54a, the purpose being to prevent rotation of the valve body when it is connected to the liquid supply line.

Solenoid 36 is shown schematically in FIG. 3; in practice it could be formed as an encapsulated winding of the type illustrated in FIG. 1. Cooperating with the winding is an armature 30a formed as a tubular member 31, as by forming from flat stock in a press operation. The downstream end portion of member 31 is turned, as at 33, and perforated to accommodate a snap-in type rubber tip element 35.

By forming armature 30a as a tubular element some advantages are obtained as respects fluid flow capacity, due to a more direct, less restricted path through the armature. The armature mass is however less, and more voltage may in some cases be required for a given port size. Extension 37 on the rubber element may be gripped manually to facilitate insertion of the element onto the armature; the extension also has some advantage as a flow spreader to direct the fluid around the rubber tip and through the valve seat orifice.

FEATURES OF THE INVENTION

The primary feature of the invention is the molded one-piece nature of element 12 whereby said element forms a housing for the flow control element 82, a threaded connector for attachment to the liquid supply line, a guide for the plunger 30 or 30a, and a valve seat for the plunger. This reduces the number of component parts in the valve assembly, and eliminates certain connecting operations which would otherwise be required to connect the component parts together.

A further feature of the invention is the use of a single metal insert 74 which functions both as a rigid seat for the flow control member 82 and as a seat for the spring 70.

An additional feature of the invention is the arrangement of tab 94 or 94a and slot 96 or 96a for preventing inadvertent rotation of the plastic valve body while the valve is being coupled to a liquid supply line.

It will be understood that the illustrated valves are illustrative forms which the invention can take, and that minor variations in arrangement and structure can be utilized without departing from the spirt of the invention as contemplated by the appended claims:

It is claimed:

1. A solenoid valve comprising a molded one piece plastic valve body; said body including a relatively large diameter cup-shaped housing having an annular side wall, a back wall, and an open inlet mouth for admitting liquid into the housing interior; said body also including a relatively small diameter elongated tubular extension formed integrally with and projecting outwardly from the housing back wall on the housing axis for receiving liquid from the housing interior; said body also including a single annular valve seat formed within the tubular extension as an integral part thereof; said valve seat being formed as an inwardly radiating flange adjacent the end of the tubular extension remote from the cup-shaped housing; said tubular projection having its internal surface devoid of undercuts or projections which would prevent formation of the entire valve body as a one-piece plastic molding;

a movable valve element cooperable with said valve seat to control liquid flow through the tubular extension; said valve element comprising an elongated armature plunger slidably positioned within the tubular extension in the space between the cup-shaped housing and valve seat; said armature plunger being cross sectioned to permit liquid to pass from the housing through the valve seat when the armature is axially spaced from the seat;

a solenoid coil-magnetic frame assembly telescoped onto the tubular extension in the area thereof between the housing and valve seat; said frame comprising a U-frame member having a web wall paralleling the tubular extension and two flanges lying against the ends of the coil; said frame further comprising magnetically permeable sleeves extending axially from the frame member flanges into the coil in surrounding relation to the tubular extension; said sleeves terminating short of one another to define a centering gap to be bridged by the armature when the coil is energized; said armature being dimensioned so that movement thereof to a position bridging the magnetic gap causes said armature to open the flow path through the valve seat;

means for mounting the valve comprising an apertured plate formed integrally with the U-frame member; threads formed on the outer surface of the cup-shaped housing for coupling the valve to a liquid supply line; and means for preventing relative rotation between the valve body and U-frame member, comprising interfitting surface discontinuities on the cup-shaped housing and the adjacent frame member flange.

2. The valve of claim 1 wherein the surface discontinuities comprise a slot formed in the outer surface of the cup-shaped housing, and a tab struck out of the adjacent frame member flange; said tab projecting into the slot when the coil-frame assembly is telescoped onto the valve body extension.

3. The valve of claim 1 wherein the surface discontinuities comprise a tab formed as an integral projection from the cup-shaped housing, and a slot formed in the adjacent frame member flange; said tab projecting into the slot when the coil-frame assembly is telescoped onto the valve body extension.

4. The valve of claim 1 and further comprising an apertured metal insert disposed within the cup-shaped housing so that liquid can flow from the housing into the tubular extension only through the insert aperture; a resilient deformable flow rate control member seated on the upstream face of the metal insert to regulate the liquid flow therethrough; and a compression coil spring trained between the armature and the metal insert for urging the armature toward the valve seat.

References Cited

UNITED STATES PATENTS

| 283,544 | 8/1883 | Weston | 251—139 XR |
| 3,412,970 | 11/1968 | Robarge | 251—139 XR |
| 3,420,260 | 1/1969 | Wisniewski | 251—139 XR |
| 2,637,344 | 5/1953 | Matthews | 251—139 |
| 2,830,743 | 4/1958 | Rimsha et al. | 251—139 X |
| 3,125,321 | 3/1964 | Van Domelen | 251—139 |
| 3,195,561 | 7/1965 | Souitzky | 251—148 X |
| 3,231,233 | 1/1966 | Herion | 251—139 |
| 3,289,697 | 12/1966 | Kozel et al. | 137—606 |

HENRY T. KLINKSEIK, Primary Examiner